United States Patent [19]

Kasugai et al.

[11] Patent Number: 5,632,296
[45] Date of Patent: May 27, 1997

[54] FLOAT VALVE FOR FUEL TANK

[75] Inventors: Joji Kasugai; Yoshihiro Nagino, both of Aichi, Japan

[73] Assignee: Toyoda Gosei Co., Ltd., Aichi, Japan

[21] Appl. No.: 410,743

[22] Filed: Mar. 27, 1995

[30] Foreign Application Priority Data

Mar. 28, 1994 [JP] Japan .................. 6-057607

[51] Int. Cl.$^6$ ........................................ B60K 15/035
[52] U.S. Cl. ............................................ 137/43
[58] Field of Search ............................. 137/43, 38

[56] References Cited

U.S. PATENT DOCUMENTS

| | | | |
|---|---|---|---|
| 4,000,828 | 1/1977 | Crute et al. | 137/43 X |
| 4,666,058 | 5/1987 | Harris | 137/43 X |
| 4,679,581 | 7/1987 | Mears | 137/43 |
| 4,685,584 | 8/1987 | Harris | 137/43 X |
| 4,753,262 | 6/1988 | Bergsma | 137/43 X |
| 4,886,089 | 12/1989 | Gabrlik et al. | 137/43 X |
| 5,065,782 | 11/1991 | Szlaga | 137/43 X |
| 5,139,043 | 8/1992 | Hyde et al. | 137/43 |

FOREIGN PATENT DOCUMENTS 439061  6/1988  Japan.
5185850  7/1993  Japan.

*Primary Examiner*—Stephen M. Hepperle
*Attorney, Agent, or Firm*—Cushman Darby & Cushman IP Group of Pillsbury Madison & Sutro LLP

[57] ABSTRACT

The float valve of the invention comprises: a case 11, float 15, valve 16 capable of closing a efflux channel 18 of air A, and ball 17 for supporting a motion of closing the float 15. A through-hole 13a for communicating air provided on the side wall 13 of the case is open at a position, the level of which is the same as that of a fuel level LF in the fuel tank in the case of appropriately filling up the fuel tank with fuel. A float body 15a of the float 15 is disposed on a plate portion 12a on the bottom wall 12 of the case at a position higher than a through-hole 13a on the side wall 13 of the case. Thereby, air can be positively discharged from the fuel tank until the fuel level reaches a position at which the fuel tank is filled up with fuel in the case of refueling, so that fuel can be smoothly fed into the fuel tank.

5 Claims, 4 Drawing Sheets

FLOAT VALVE FOR FUEL TANK

The priority application, Japanese Patent Application Hei-6-57607, filed in Japan on Mar. 28, 1994 is hereby incorporated into the present specification by reference.

FIELD OF THE INVENTION

The present invention relates to a float valve for use in a fuel tank. The valve is disposed at an upper portion of the fuel tank and allows air in the fuel tank to flow out when refueling.

BACKGROUND OF THE INVENTION

Conventionally, this type of float valve is disclosed in Japanese Unexamined Patent Publication No. 5-185850 and Japanese Utility Model Publication No. 4-39061, and the structure of the float valve is shown in FIG. 1.

The float valve V0 includes: a cylindrical case 1 having a bottom; float 4 accommodated in the case 1; valve 5 disposed at an upper portion of the float 4, being capable of closing an air efflux channel 7; and compression coil spring 6 disposed between the float 4 and a bottom wall 2 of the case 1. In this structure, the case 1 is fixed onto an upper wall 9 of the fuel tank 8.

On the bottom and side walls 2, 3 of the case 1, there are provided through-holes 2a, 3a for allowing fuel F and air A to flow into the case 1.

The coil spring 6 is used for supporting the float 4 so that the air efflux channel 7 can be closed by the float when a vehicle is inclined or overturned. For example, when the vehicle is overturned, the air efflux channel 7 is placed below the float 4. In this case, a spring force of the spring 6 is determined so that the total force of a mass of the float 4 and a pushing force of the spring 6 can be higher than a buoyancy of the float 4. Of course, the spring force of the spring 6 is determined in the following manner: Before the level of fuel F is raised under the condition that the vehicle is in an appropriate posture, the float 4 is not lifted up by the spring 6 to close the air efflux channel 7, but the total force of the buoyancy of the float 4 and the pushing force of the spring 6 becomes higher than the mass of the float 4 when the float 4 is dipped in fuel 4.

Due to the foregoing, in this type float valve V0, when the level of fuel F in the fuel tank 8 is raised, fuel F flows into the case 1 through the through-holes 2a, 3a, so that the float 4 is raised. Accordingly, when valve 5 closes the air efflux channel 7 fuel F will be prevented from flowing to the outside of tank 8. In this connection, after air has been vented through the air efflux channel 7, it is sent to a canister not shown in the drawing.

However, when fuel F is fed to the fuel tank 8 during refueling, a large amount of fuel F is fed in a short period of time. Therefore, the following problems may be encountered in the conventional float valve V0.

In the case of refueling, air A may suddenly flow into the case 1 through the through-holes 2a, 3a, so that air A flows into case 1 and out 8 the air efflux channel 7 at high speed. Accordingly, such flow may raise the float 4. Under the above condition, fuel F flows into the case 1 through the throughhole 2a on the bottom wall 2 of the case 1, and the float 4 is raised by the buoyancy of fuel F. Then, before the level of fuel F is reached to a position LF which corresponds to a fuel level at which the float 4 is disposed at an appropriate valve closing position, the valve 5 closes the air efflux channel 7 by the high speed air flow action. This valve closing motion tends to occur when buoyancy is activated on the float 4 by fuel F because a downward force of the float 4 is reduced at this time. In this case, the downward force of the float 4 is a value obtained when the buoyancy of the float 4 and the pushing force of the spring are subtracted from the mass of the float 4.

Due to the above valve closing motion, air to be discharged outside the fuel tank 8 is stored in the fuel tank. Therefore, the fuel level in the fuel tank 8 on the fuel feeding side is raised, so that an automatic stopping mechanism of the fuel nozzle, by which fuel is fed into the fuel tank 8, is operated and the fuel feeding operation is stopped. In this way, problems are caused during refueling.

SUMMARY OF THE INVENTION

The present invention is directed to solving the above problems. It is an object of the present invention to provide a float valve for use in a fuel tank by which air can be positively discharged from the fuel tank until the fuel level reaches a position at which the fuel tank is filled up with fuel in the case of refueling, so that fuel can be smoothly fed into the fuel tank.

The present invention relates to a float valve for a fuel tank that allows air in the fuel tank to flow out during refueling. A case or an enclosure is disposed at an upper portion of the fuel tank. That case includes at least a bottom wall and a side wall that extends upwardly from a periphery of the bottom wall. A through-hole or air hole is provided on the side wall and a float is accommodated with in the case. A valve, disposed at an upper portion of the float, is capable of closing the opening of an air efflux channel located directly above the float, through which air flows out. Also, an auxiliary member, disposed between the bottom wall and the float, aids the closing motion of the float. The throughhole on the side wall of the case is positioned at a level which is the same as that fuel level in a full fuel tank. A float body of the float generates buoyancy at a position higher than the level of the through-hole on the side wall of the case.

The auxiliary member may be composed of a spherical ball coming into contact with a lower surface of the float and an upper surface of the bottom wall of the case, and a center of the upper surface of the bottom wall is recessed so that a periphery of the bottom wall is raised.

Alternatively, the auxiliary member may be a compression coil spring, the upper end of which is contacted with a lower surface of the float, and the lower end of which is contacted with an upper surface on the bottom wall of said case.

In the float valve for use in a fuel tank of the present invention, fuel flows into a case so that the case can be raised in the process of refueling into the fuel tank. When the float is raised, an air efflux channel is closed by the valve.

However, in the float valve of the present invention, a float body for generating a buoyancy is disposed at a position higher than the through-hole formed on the side wall on the bottom wall of the case. The position at which the throughhole on the side wall of the case is located coincides with a level of fuel that has been appropriately refueled into the fuel tank.

Accordingly, when the float is dipped in fuel and raised by the action of a buoyancy, the fuel tank has already been filled up with fuel. That is, even when air flows into the valve at high speed, float buoyancy is not generated before the fuel tank is filled up with fuel. Accordingly, it is possible to prevent the float from rising by the action of air flow, so that the air efflux channel is not prematurely closed. The air efflux channel is positively closed with the valve activated by the buoyancy of the float after the fuel tank has been filled up with fuel.

Accordingly, in the float valve for use in a fuel tank of the present invention, when the fuel tank is filled up with fuel, air in the fuel tank can be positively discharged from the fuel tank until the level of fuel reaches a position at which the fuel tank is filled up with fuel. Therefore, the fuel tank can be smoothly filled up with fuel.

The auxiliary member may be composed of a spherical ball coming into contact with a lower surface of the float and an upper surface of the bottom wall of the case. The center of the upper surface of the bottom wall can be recessed so that the wall rises toward the periphery of the bottom wall. Due to the foregoing structure, when a vehicle is running on a curved road and subjected to rolling so that a fuel level in the fuel tank is partially raised by the action of transversal G, the ball in the float valve moves from the center of the upper surface of the bottom wall toward the periphery and the ball rises along the upper surface of the bottom wall. Therefore, the float is lifted by the ball, and the air efflux channel can be closed by the valve. Accordingly, even when the vehicle runs on a curved road and is subjected to rolling, it is possible to prevent fuel from flowing out from the air efflux channel.

When the auxiliary member is composed of a compression spring, the upper end of which comes into contact with the lower surface of the float, and the lower end of which comes into contact with the upper surface of the bottom wall of the case, even if the design of the float is changed so as to change the weight and configuration, a pushing force of the float can be easily adjusted by replacing the compression spring, so that the air efflux channel can be closed.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS

With reference to the accompanying drawings, an embodiment of the present invention will be explained as follows.

Figure 1:
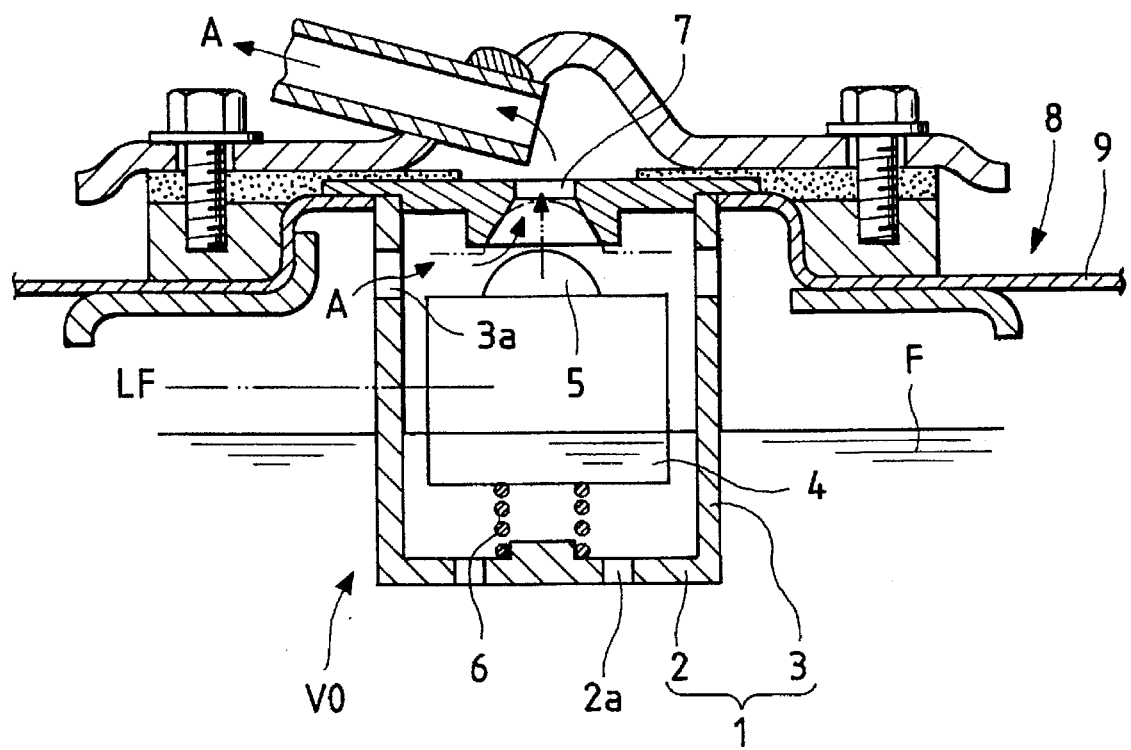
FIG. 1 is a cross-sectional view of a conventional float valve.
Figure 2:
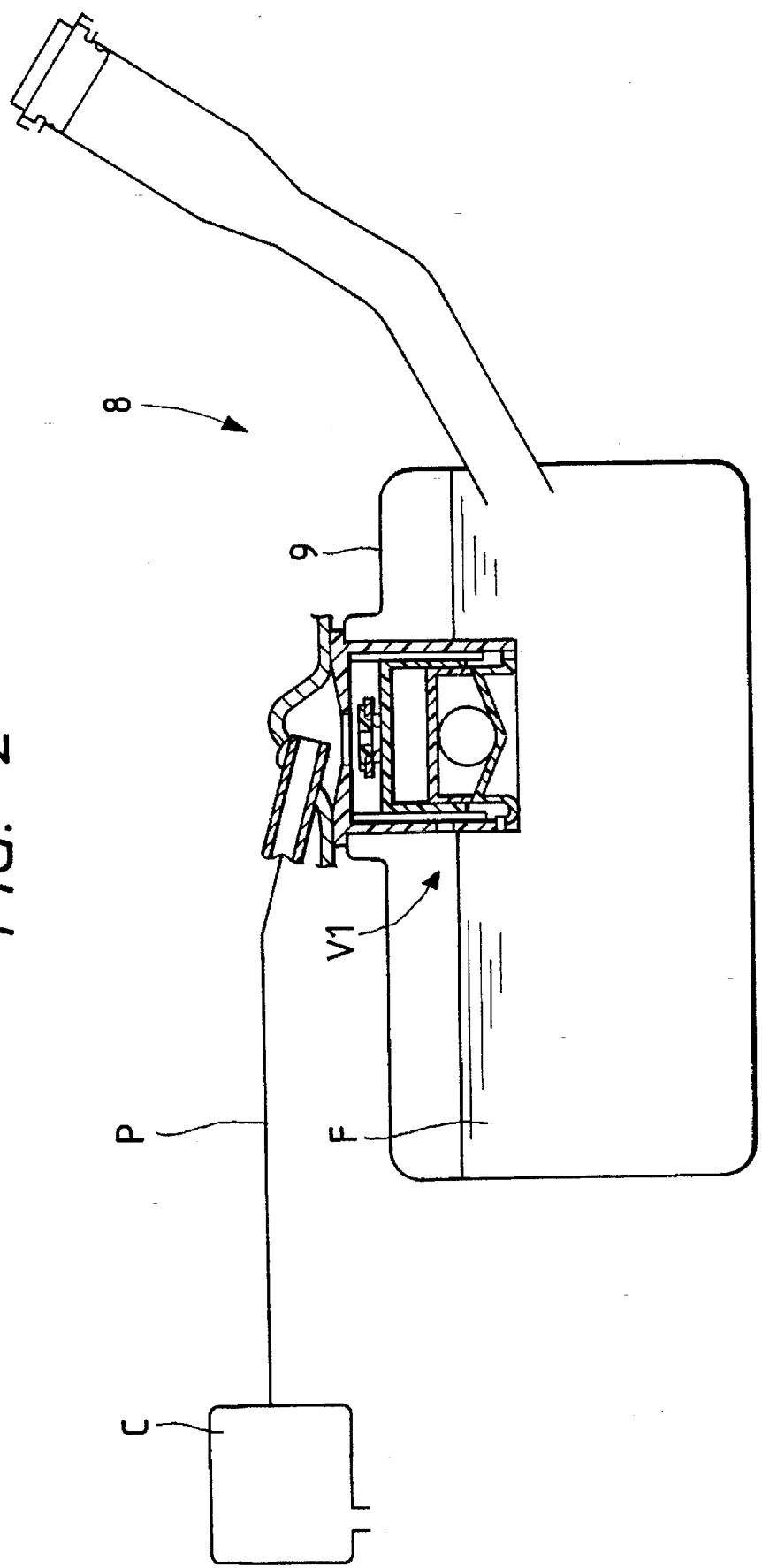
FIG. 2 is a partially enlarged, cross-sectional view of a first embodiment of the present invention where the float valve is mounted on the fuel tank.
Figure 3:
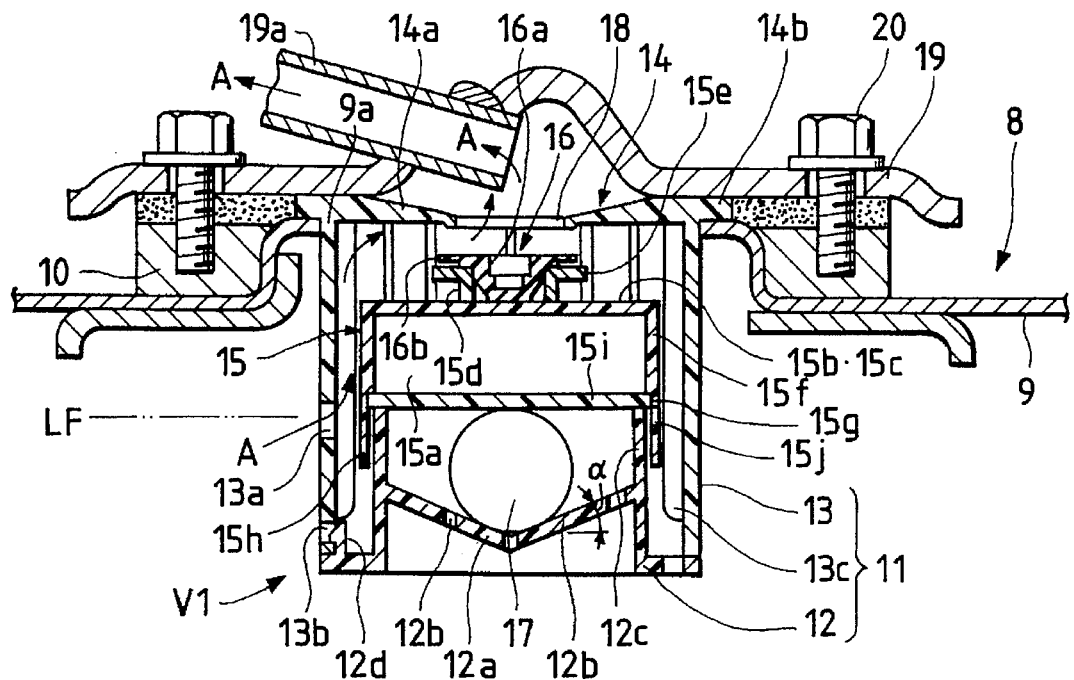
FIG. 3 is a further enlarged, cross-sectional view thereof, with the valve open.

As illustrated in FIGS. 2 and 3, the float valve V1, for use in a fuel tank, includes a case 11, a float 15 provided in the case 11, and a ball 17 used as an auxiliary member for supporting a valve closing motion of the float 15. The float valve V1 is disposed on an upper wall 9 of the fuel tank 8. In this connection, a pipe P provided on the side of a canister C, a fuel feed pipe not shown provided on the side of an engine and a return pipe of fuel F are connected to the fuel tank 8. The case 11 is made of a material resistant to fuel oil, preferably a synthetic resin. The case 11 includes an approximately circular bottom wall 12, an approximately cylindrical side wall 13, and an annular ceiling 14 provided at an upper end of the side wall 13. Ceiling 14 extends to the inner and outer circumferential sides.

The bottom wall 12 includes: a reverse-umbrella-shaped plate portion 12a, the center of which is conically recessed so that the upper surface rises toward the periphery; a support portion 12c for supporting the float 15, the support portion 12c extending upward from the periphery of the plate portion 12a; and an engaging projection 12d for engaging with an engaging hole 13b on the side wall 13, the engaging projection 12d extending downward from the periphery of the plate portion 12a. A plurality of throughholes 12b are formed in the plate portion 12a.

The angle α, formed by the upper surface of the plate portion 12a with respect to the horizon, can range from about 5° through about 45°, in accordance with the volume and mass of the float 15. The reason why the angle α is determined to range between about 5° through about 45° is as follows. If the angle α is smaller than 5°, the float 15 can not be stably closed when the vehicle is subjected to rolling. If the angle α is larger than 45°, the valve closing operation of the float 15 by transversal G can not be stably conducted.

The side wall 13 extends upwardly from the periphery of the bottom wall 12. A plurality of through-holes 13a, communicating the interior circumferential side with the outer circumferential side, are provided at an intermediate position in the side wall 13. An engaging hole 13b, engaging with an engaging projection 12d of the bottom wall 12, is provided at a predetermined position in the lower portion of side wall 13. A plurality of ribs 13c, for guiding the float 15 in the vertical direction, are provided on the interior circumferential surface of the side wall 13.

The position at which through-hole 13a is located coincides with that level, LF, of fuel F where the fuel tank 8 has been filled up with fuel, with the valve V1 attached onto the upper wall 9 of the tank 8.

The height of the support portion 12c of the bottom wall 12 is determined so that the float body 15a described later for generating a buoyancy of the float 15, can be supported at a position higher than the through-hole 13a.

The ceiling 14 includes a bulkhead 14a extending to the inner circumferential side of the side wall 13, and a flange portion 14b extending to the outer circumferential side of the side-wall 13. A hole formed at the center of the bulkhead 14a functions as an air efflux channel 18 from which air A flows out to the canister C. The flange 14b is a portion utilized when the float valve V1 is fixed onto the upper wall 9 of the tank. The valve V1 is fixed onto the upper wall 9 of the tank in such a manner that the valve V1 is mounted with bolts 20 on a base 10 welded to the periphery of an attaching hole 9a of the upper wall 9 of the tank via an upper lid 19 and a sealing member, the reference numeral number of which is omitted in the drawing. A nipple 19a is fixed to the upper lid 19, and the nipple 19a is connected to the pipe P which is connected to the canister C.

The float 15 is composed of an upper cover 15b and a lower cover 15i made of oil-resistant synthetic resin. The upper cover 15b, includes a circular ceiling 15c and a cylindrical portion 15f extends downwardly from the periphery thereof. The lower cover 15i is formed to be circular, and adhered to a step portion 15g of the cylindrical portion 15f. A portion tightly sealed up by the upper and lower covers 15b, 15i functions as a float body 15a for generating buoyancy by fuel F. At the center of the upper surface of the upper cover 15b, a cylindrical portion 15d protrudes upwardly and supports a fixed valve 16 for closing the opening into air efflux channel 18. A flange 15e extends radially outwardly and is attached to an upper end of cylindrical portion 15d.

In this connection, the diameter of cylindrical portion 15f is a little smaller than an inner diameter of the ribs 13c provided on the side wall 13 of the case. A depending skirt 15h is provided below cylindrical portion 15f and between the rib 13c and the support portion 12c of the bottom wall 12. This permits the float 15 to move smoothly, in an up and down manner, without being inclined. The skirt 15h extends downwardly to a position lower than the through-hole 13a so that the float body 15a can not rise to the surface by the action of air flowing from the through-hole 13a on the side wall 13. A through-hole 15j of the skirt 15h is provided for discharging air in the skirt 15h.

The valve 16 is made of rubber such as fluorine rubber and nitrile rubber. The valve 16 is composed of a base 16a engaged with the cylindrical portion 15d, and a seal 16b disposed at an upper end of the base 16a. In order to enhance the valve closing sensitivity in the case of closing the air efflux channel 18, the seal 16b is formed to be like a thin disk extending from the upper end of the base 16a to the outside in the radial direction, and the seal 16b is disposed in such a manner that it floats on the flange 15e of the assembling cylindrical portion 15d.

The ball 17 is made of steel such as stainless steel and formed to be spherical. The diameter of ball 17 is determined so that ball 17 comes into contact with the lower surface of the lower cover 15i when float 15 is supported by, or is resting on, the support portion 12c of the bottom wall 12 of the case with ball 17 resting at the center of plate portion 12a.

In the float valve V1 of this first embodiment when refueling the fuel tank 8, fuel F flows into the case 11 so that the float 15 can be raised. Therefore, the float 15 is raised, and the air efflux channel 18 is closed by the valve 16.

The float body 15a, which generates the buoyancy of float 15, is disposed at a position higher than the through-hole 13a provided on the side wall 13, and through-hole 13a is positioned to 13 coincide with the desired fill level LF at which the fuel tank 8 is the appropriately filled up with fuel.

Figure 4:
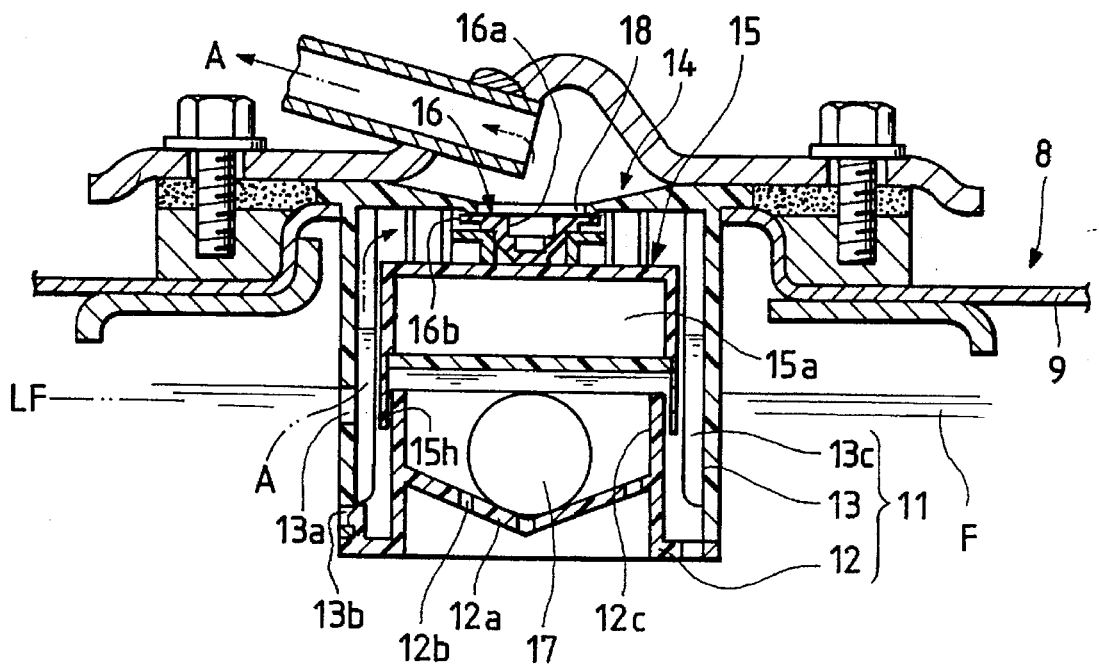
FIG. 4 is a cross-sectional view showing the valve closed and a full fuel tank.

Accordingly, as illustrated in FIG. 4, when float 15 is immersed in fuel F and floats by the action of buoyancy, the fuel tank 8 has already been filled up with fuel F. Even if the flow rate of air A flowing through the through-hole 13a is high, buoyancy is not generated by the float 15 before the fuel tank 8 is filled up with fuel. Accordingly, it is possible to prevent the air efflux channel 18 from being closed since float 15 is prevented from rising by reason of airflow. Surely, after the fuel tank 8 has been filled up float 15 rises by the action of buoyancy, and the opening into air efflux channel 18 is closed by valve 16.

Accordingly, in the float valve V1 when fuel tank 8 is filled with fuel F, air A can be positively discharged from the fuel tank 8 until the fuel level reaches a position corresponding to the desired filled condition. Therefore, the fuel tank 8 can be smoothly filled with fuel.

Figure 5:
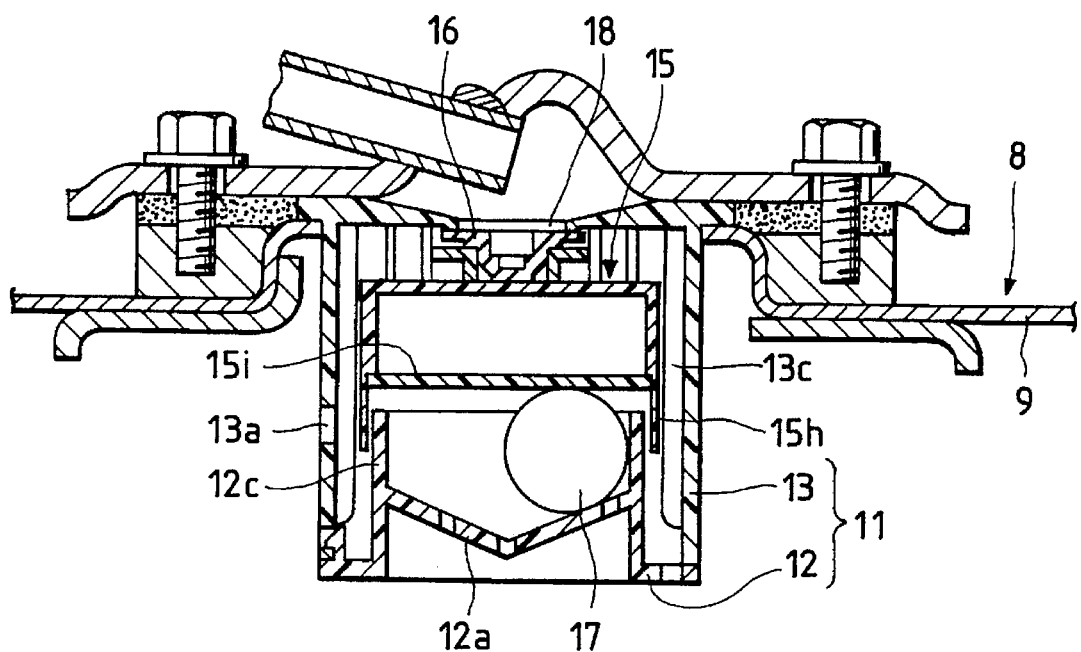
FIG. 5 is a cross-sectional view showing operation of the auxiliary member.

In the float valve V1 of the first embodiment, the auxiliary member for supporting a valve closing motion of the float valve 15 is a spherical ball 17 that contacts the lower surface of lower cover 15i and the upper surface of plate portion 12a. The center of the upper surface of the plate portion 12a of the bottom wall 12 of the case is recessed and the periphery is raised. Therefore, when a vehicle is running on a curved road and subjected to rolling, so that a fuel level in the fuel tank 8 is partially raised by the action of transversal G, ball 17 moves from the center of the upper surface of the plate portion 12a toward the periphery and thus rises as it moves along the upper surface of plate portion 12a. Therefore, as illustrated in FIG. 5, the float 15 is lifted by ball 17, and the air efflux channel 18 can be closed by the valve 16. Accordingly, even when the vehicle runs on a curved road and is subjected to rolling, it is possible to prevent fuel F from flowing out from the air efflux channel 18.

Figure 6:
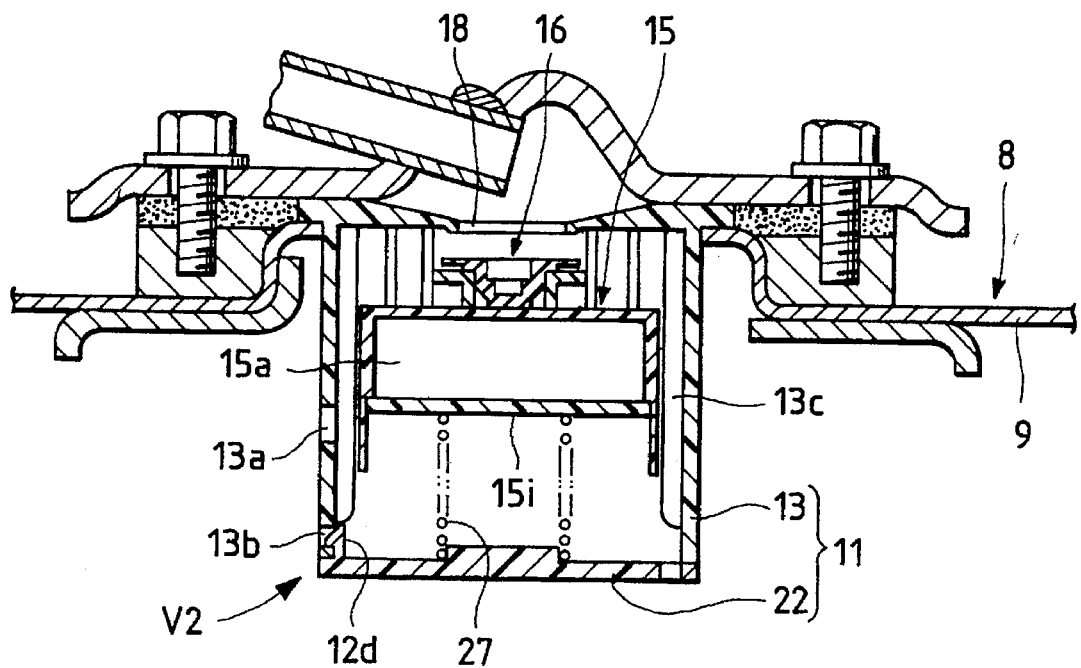
FIG. 6 is a cross-sectional view showing a second embodiment.

As illustrated in FIG. 6, the auxiliary member for supporting a valve closing motion of the float 15 may be composed of a compression spring 27, the upper end of which comes into contact with a lower surface of the lower cover 15i of the float, and the lower end of which contacts the upper surface of the bottom wall 22 of the case. In this float valve V2, even if the design of the float 15 is changed so as to change the weight and configuration of the float 15, the pushing force of the float can be easily adjusted by replacing the compression spring so that the air efflux channel 18 can be closed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A float valve for a fuel tank constructed and arranged to allow air in a fuel tank to be vented during refueling, said float valve comprising:

a case disposed at an upper portion of a fuel tank about an opening into an air efflux channel, said case including at least a bottom wall and a side wall extending upwardly from a peripheral edge of said bottom wall and connected to said fuel tank, an air hole being formed in said side wall;

a float member accommodated in said case, said float member including a float body, defining a sealed chamber, that generates buoyancy, said chamber being disposed at a position entirely above a center of said air hole, said float member including a skirt extending downwardly from said float body to a position lower than said air hole;

a valve element disposed at an upper portion of said float, and being capable of closing said air efflux channel; and an auxiliary member disposed between said bottom wall and said float so as to assist in a valve-closing movement of said float, wherein said air hole is located at a position generally equal to where the fuel level exists for a full fuel tank.

2. The float valve for a fuel tank according to claim 1, wherein said auxiliary member is retained between said float member and said bottom wall, said bottom wall including a conical inclined recessed portion and a raised peripheral portion, and wherein said auxiliary member comprises a ball member.

3. The float valve for a fuel tank according to claim 1, wherein said auxiliary member is a compression coil spring, an upper end of which is in contact with a lower surface of said float and a lower end contacts an upper surface of said bottom wall.

4. The float valve for a fuel tank according to claim 1, wherein said valve element is comprised of flexible material.

5. The float valve for a fuel tank according to claim 2, wherein an angle formed by said conical inclined recessed portion with respect to the horizon ranges from about 5° to about 45° in accordance with the volume and mass of said float member.

* * * * *